(12) United States Patent
Quek et al.

(10) Patent No.: US 9,904,819 B2
(45) Date of Patent: Feb. 27, 2018

(54) INCREASING BACKSCATTER LEVEL FOR RFID CHIP

(71) Applicant: Ruizhang Technology Limited Company, Shanghai (CN)

(72) Inventors: Chee Kwang Quek, Sunnyvale, CA (US); Steve Wang, San Jose, CA (US)

(73) Assignee: Ruizhang Technology Limited Company, Shanghai (CN)

(*) Notice: Subject to any disclaimer, the term of this patent is extended or adjusted under 35 U.S.C. 154(b) by 20 days.

(21) Appl. No.: 14/845,225

(22) Filed: Sep. 3, 2015

(65) Prior Publication Data

US 2017/0061172 A1 Mar. 2, 2017

(30) Foreign Application Priority Data

Aug. 24, 2015 (CN) .......................... 2015 1 0522404

(51) Int. Cl.
*G06K 7/00* (2006.01)
*G06K 7/10* (2006.01)

(52) U.S. Cl.
CPC ................................ *G06K 7/10148* (2013.01)

(58) Field of Classification Search
CPC ......................... H04W 4/008; G06K 7/10148
USPC ................................................ 340/10.1–10.6
See application file for complete search history.

(56) References Cited

U.S. PATENT DOCUMENTS

| | | |
|---|---|---|
| 5,874,724 A | 2/1999 | Cato |
| 5,892,267 A | 4/1999 | Takada |
| 6,134,130 A | 10/2000 | Connell et al. |
| 6,175,264 B1 | 1/2001 | Jinbo |
| 6,232,826 B1 | 5/2001 | Afghahi |
| 6,239,651 B1 | 5/2001 | Fournel |
| 6,388,534 B1 | 5/2002 | Balzano |
| 6,433,619 B2 | 8/2002 | Akita et al. |
| 6,549,064 B2 | 4/2003 | Bandy et al. |
| 6,734,475 B2 | 5/2004 | Myono et al. |
| 6,734,797 B2 | 5/2004 | Shanks et al. |
| 6,784,813 B2 | 8/2004 | Shanks et al. |
| 6,841,981 B2 | 1/2005 | Smith et al. |
| 6,914,528 B2 | 7/2005 | Pratt et al. |
| 7,068,173 B2 | 6/2006 | Shanks et al. |
| 7,116,240 B2 | 10/2006 | Hyde |

(Continued)

FOREIGN PATENT DOCUMENTS

| | | |
|---|---|---|
| CN | 1710795 A | 12/2005 |
| CN | 101019127 A | 8/2007 |

(Continued)

OTHER PUBLICATIONS

European Search Report, Publication. No. EP 2 420 958 A3, dated Mar. 5, 2012, 3 pages.

(Continued)

*Primary Examiner* — Qutbuddin Ghulamali
(74) *Attorney, Agent, or Firm* — Womble Bond Dickinson (US) LLP

(57) ABSTRACT

An input power on a tag is monitored. An input impedance of the tag is adjusted based on the monitored input power to increase a backscatter level of the tag. In one embodiment, an output voltage of a rectifier device is monitored. An input power to the tag is determined based on the output voltage. An input impedance of the tag is adjusted based on the input power to increase the backscatter level of the tag.

25 Claims, 10 Drawing Sheets

(56) References Cited

U.S. PATENT DOCUMENTS

| | | |
|---|---|---|
| 7,174,142 B2 | 2/2007 | Watabe |
| 7,248,165 B2 | 7/2007 | Collins et al. |
| 7,339,485 B2 | 3/2008 | Ku et al. |
| 7,424,265 B2 | 9/2008 | Umeda et al. |
| 7,501,947 B2 | 3/2009 | Youn |
| 7,716,160 B2 | 5/2010 | Smith et al. |
| 7,772,964 B2 | 8/2010 | Tethrake et al. |
| 7,920,064 B2 | 4/2011 | Kang |
| 7,996,035 B2 | 8/2011 | Nguyen et al. |
| 8,102,244 B2 | 1/2012 | Smith |
| 8,390,456 B2* | 3/2013 | Puleston ............... G06K 7/0008 340/10.1 |
| 8,395,505 B2 | 3/2013 | Hadley et al. |
| 8,542,157 B2 | 9/2013 | Wu et al. |
| 8,981,955 B2* | 3/2015 | Schaible ................ F16P 3/14 340/10.1 |
| 2004/0155754 A1 | 8/2004 | Fischer et al. |
| 2005/0237843 A1 | 10/2005 | Hyde |
| 2005/0263591 A1 | 12/2005 | Smith |
| 2006/0043454 A1 | 3/2006 | Coolbaugh |
| 2006/0250220 A1 | 11/2006 | Stewart |
| 2007/0127560 A1 | 6/2007 | Kang et al. |
| 2007/0252185 A1 | 11/2007 | Kang |
| 2007/0257776 A1 | 11/2007 | Kim et al. |
| 2007/0285229 A1 | 12/2007 | Batra et al. |
| 2008/0101106 A1 | 5/2008 | Pillai |
| 2008/0185432 A1 | 8/2008 | Caballero et al. |
| 2009/0146785 A1 | 6/2009 | Forster |
| 2012/0049937 A1 | 3/2012 | El Waffaoui |
| 2012/0169468 A1* | 7/2012 | Butler .................. G06K 7/0008 340/10.1 |
| 2015/0188311 A1 | 7/2015 | Kato et al. |
| 2015/0214927 A1 | 7/2015 | Greene et al. |
| 2015/0302234 A1* | 10/2015 | Mats ................. G06K 7/10366 340/10.1 |

FOREIGN PATENT DOCUMENTS

| | | |
|---|---|---|
| EP | 2023464 A2 | 2/2009 |
| EP | 2288023 | 2/2011 |
| EP | 2434652 A1 | 3/2012 |
| TW | 367472 B | 8/1999 |
| WO | WO 2006/073129 A1 | 7/2006 |
| WO | WO 2014/000471 A1 | 1/2014 |

OTHER PUBLICATIONS

International Preliminary Report on Patentability, for the PCT Int'l. Appln. No. US2009/039826, dated Oct. 12, 2010, (13 pages).
PCT Notification of Transmittal of the International Search Report and Written Opinion of the International Searching Authority, or the Declaration, for the PCT Int'l. Appln. No. US2009/039826, dated Sep. 14, 2010, (22 pages).
EP Examination Report dated Aug. 10, 2015 for European Patent Application No. 10015155.4.
European Search report for European Application No. EP16001861.0 dated Aug. 3, 2017.

* cited by examiner

INCREASING BACKSCATTER LEVEL FOR RFID CHIP

This application claims priority under 35 U.S.C. § 119 to Chinese Patent Application No. 201510522404.1 filed on Aug. 24, 2015.

FIELD

Embodiments of the present invention pertain to the field of radio frequency identification (RFID) devices, and more particularly to improving detection of RFID tags.

BACKGROUND

Generally, radio frequency identification (RFID) refers to a technology that incorporates the use of signals in the radio frequency (RF) portion of the electromagnetic spectrum to uniquely identify a tag. An RFID device is often referred to as a tag. Typically, interrogating devices (commonly referred herein as interrogators or readers) obtain information from wireless tags by sending a command to a tag and receiving a response from the tag. Typically, the interrogator device includes a transmitter to transmit RF signals to the tag and a receiver to receive tag modulated information from the tag. The transmitter and receiver can be combined as a transceiver which can use one or more antennas.

RFID transponders (commonly referred to herein as "tags") in the form of labels, inlays, straps or other forms are widely used to associate an object with an identification code. Tags generally include one or more antennas with analog and/or digital electronic circuits that include communications electronics (such as an RF transceiver), data memory (for storing one or more identification codes), processing logic (such as a microcontroller) and one or more state storage devices. Examples of applications that can use RFID tags include luggage tracking, inventory control or tracking (such as in a warehouse), parcel tracking, access control to buildings or vehicles, etc.

Generally, there are three basic types of RFID tags. An active tag, having an independent power supply, includes its own radio frequency source for transmission. A battery-powered semi-passive tag also receives and reflects radio waves from the reader; however a battery powers the tag independent of receiving power from the reader.

A passive tag is a beam powered device which rectifies energy required for operation from radio waves generated by a reader and transmitted to the passive tag. For communication, the passive tag creates a change in reflectivity of the field which is reflected to and read by the reader. This is commonly referred to as backscattering.

SUMMARY

Methods and apparatuses to increase a backscatter level for an RFID chip (commonly referred to herein as a tag) are described. In one embodiment, an input power on a passive backscattering tag is monitored. An input impedance of the tag is adjusted based on the monitored input power to increase a backscatter level of the tag.

In one embodiment, an input power on the tag is monitored by determining if the input power is greater than a predetermined level. An input impedance of the tag is adjusted, if the input power level is greater than the predetermined level to increase a backscatter level of the tag. In addition, when the tag is backscattering to the reader, the input impedance is changed in accordance with the backscatter data (e.g. ab RFID identification code) sent to the reader as is known in the art.

In one embodiment, adjusting the input impedance of the tag can involve selecting one or more rectifier stages on the tag, and bypassing the selected one or more rectifier stages.

In one embodiment, the adjusting of the input impedance can involve sending a control signal to turn off a switch coupled to a rectifier stage of the tag.

In one embodiment, an input power on the tag is monitored, and an input impedance of the tag is adjusted based on the monitored input power to increase a backscatter level of the tag. The input impedance of the tag is adjusted for a predetermined time, the predetermined time being one of a transaction time or a tag transmission time.

In one embodiment, a tag comprises a rectifier device that receives an RF signal from an RFID reader. An output voltage of the rectifier device of a tag is monitored. An input power to the tag is determined based on the output voltage of the rectifier device. An input impedance of the tag is adjusted based on the input power to increase a backscatter level of the tag. Adjusting the input impedance of the tag can involve sending a first control signal to a first switch coupled to the rectifier device, if the input power is greater than a first predetermined level; and sending a second control signal to a second switch coupled to the rectifier device, if the input power is greater than a second predetermined level.

In one embodiment, a tag comprises a rectifier device that receives an RF signal from an RFID reader. An output voltage of the rectifier device of the tag is monitored. An input power to the tag is determined based on the output voltage. An input impedance of the tag is adjusted based on the input power to increase a backscatter level of the tag that involves selecting one or more rectifier stages; and bypassing the selected one or more rectifier stages. The selection of the number of rectifier stages depends upon the monitored output voltage from the rectifier device.

In one embodiment, a tag comprises a rectifier device. An output voltage of the rectifier device of the tag is monitored. An input power to the tag is determined based on the output voltage. An input impedance of the tag is adjusted based on the input power to increase a backscatter level of the tag. The input impedance is adjusted for a predetermined time, the predetermined time being one of a transaction time or a tag transmission time.

In one embodiment, a tag comprises a rectifier device. An output voltage of the rectifier device of the tag is monitored. An input power to the tag is determined based on the output voltage. An input impedance of the tag is adjusted based on the input power to increase a backscatter level of the tag. The input impedance is adjusted to compensate for a change in the input impedance associated with an increase of the input power.

In one embodiment, an apparatus comprises a receiver to receive an input power and a controller circuit coupled to the receiver. The controller circuit is configured to monitor the input power on a tag. The controller circuit is configured to adjust an input impedance of the tag based on the monitored input power to increase a backscatter level of the tag.

In one embodiment, an apparatus comprises a receiver to receive an input power and a controller circuit coupled to the receiver. The controller circuit is configured to monitor the input power on a tag. The controller circuit is configured to determine if the input power is greater than a predetermined level. The controller circuit is configured to adjust the input impedance of the tag, if the input power level is greater than the predetermined level to increase a backscatter level of the tag.

In one embodiment, an apparatus comprises a receiver to receive an input power and a controller circuit coupled to the receiver. The controller circuit is configured to monitor the input power on a tag. The controller circuit is configured to adjust an input impedance of the tag based on the monitored input power to increase a backscatter level of the tag. The controller circuit is configured to select one or more rectifier stages on the tag. The controller circuit is further configured to bypass the selected one or more rectifier stages to adjust the input impedance of the tag.

In one embodiment, an apparatus comprises a receiver to receive an input power and a controller circuit coupled to the receiver. The controller circuit can be configured to monitor the input power on a tag. The controller circuit can be configured to adjust an input impedance of the tag based on the monitored input power to increase a backscatter level of the tag. The controller circuit can be configured to send a control signal to turn off a switch coupled to a rectifier stage of the tag to adjust the input impedance of the tag.

In one embodiment, an apparatus comprises a receiver to receive an input power and a controller circuit coupled to the receiver. The controller circuit is configured to monitor the input power on a tag. The controller circuit is configured to adjust an input impedance of the tag based on the monitored input power to increase a backscatter level of the tag. The input impedance is adjusted for a predetermined time, the predetermined time being one of a transaction time or a tag transmission time.

In one embodiment, an apparatus comprises a receiver to receive an input power and a controller circuit coupled to the receiver. The controller circuit is configured to monitor the input power on a tag. The controller circuit is configured to adjust an input impedance of the tag based on the monitored input power to increase a backscatter level of the tag. The input impedance of the tag is modulated based on backscatter data.

In one embodiment, a tag to increase a backscatter level comprises a receiver to receive an input power, a rectifier device comprising one or more stages coupled to the receiver; and a controller circuit coupled to the rectifier device. The controller circuit is configured to monitor an output voltage of the rectifier device. The controller circuit is configured to determine an input power to the tag based on the output voltage. The controller circuit is configured to adjust an input impedance of the tag based on the input power to increase the backscatter level of the tag.

In one embodiment, a tag to increase a backscatter level comprises a receiver to receive an input power, a rectifier device comprising one or more stages coupled to the receiver; and a controller circuit coupled to the rectifier device. The controller circuit is configured to monitor an output voltage of the rectifier device. The controller circuit is configured to determine an input power to the tag based on the output voltage. The controller circuit is configured to adjust an input impedance of the tag based on the input power to increase the backscatter level of the tag that involves sending a first control signal to a first switch coupled to the rectifier device, if the input power is greater than a first predetermined level; and sending a second control signal to a second switch coupled to the rectifier device, if the input power is greater than a second predetermined level.

In one embodiment, a tag to increase a backscatter level comprises a receiver to receive an input power, a rectifier device comprising one or more stages coupled to the receiver; and a controller circuit coupled to the rectifier device. The controller circuit is configured to monitor an output voltage of the rectifier device. The controller circuit is configured to determine an input power to the tag based on the output voltage. The controller circuit is configured to adjust an input impedance of the tag based on the input power to increase the backscatter level of the tag that involves selecting the one or more stages of the rectifier device, and bypassing the selected one or more stages of the rectifier device.

In one embodiment, a tag to increase a backscatter level comprises a receiver to receive an input power, a rectifier device comprising one or more stages coupled to the receiver; and a controller circuit coupled to the rectifier device. The controller circuit is configured to monitor an output voltage of the rectifier device. The controller circuit is configured to determine an input power to the tag based on the output voltage. The controller circuit is configured to adjust an input impedance of the tag based on the input power to increase the backscatter level of the tag. The input impedance of the tag is adjusted for a predetermined time, the predetermined time being one of a transaction time or a tag transmission time.

In one embodiment, a tag to increase a backscatter level comprises a receiver to receive an input power, a rectifier device comprising one or more stages coupled to the receiver; and a controller circuit coupled to the rectifier device. The controller circuit is configured to monitor an output voltage of the rectifier device. The controller circuit is configured to determine an output current of the rectifier device based on the output voltage. The controller circuit is configured to determine an input power to the tag based on at least one of the output current or output voltage. The controller circuit is configured to adjust an input impedance of the tag based on the input power to increase the backscatter level of the tag.

In one embodiment, a tag to increase a backscatter level comprises a receiver to receive an input power, a rectifier device comprising one or more stages coupled to the receiver; and a controller circuit coupled to the rectifier device. The controller circuit is configured to monitor an output voltage of the rectifier device. The controller circuit is configured to determine an input power to the tag based on the output voltage. The controller circuit is configured to adjust an input impedance of the tag based on the input power to increase the backscatter level of the tag. The input impedance is adjusted to compensate for a change in the input impedance associated with an increase of the input power.

Other embodiments are also described herein, and this summary is not intended to discuss all aspects of this disclosure.

BRIEF DESCRIPTION OF THE DRAWINGS

The embodiments as described herein are illustrated by way of example and not limitation in the figures of the accompanying drawings in which like references indicate similar elements.

FIG. 4 illustrates how reflection coefficient changes with reader RF power level.

DETAILED DESCRIPTION

Methods and apparatuses to increase a backscatter level for an RFID chip (tag) to improve detection of the RFID interrogator are described. The following description and drawings are illustrative of at least one embodiment of the invention and are not to be construed as limiting. Numerous specific details are described to provide a thorough understanding of the embodiments of the present invention. However, in certain instances, well-known or conventional details are not described in order to avoid obscuring the description of the embodiments of the present invention. The term "coupled" as used herein, may mean directly coupled or indirectly coupled through one or more intervening components. References to one or an embodiment in the present disclosure are not necessarily references to the same embodiment, and such references mean at least one.

In one embodiment, an input power on a tag is monitored. An input impedance of the tag is adjusted based on the monitored input power to increase a backscatter level of the tag. In addition, the tag, when backscattering data back to the reader, controls the input impedance by modulating the input impedance in accordance with the data to be backscattered back to the readers, as is known in the art.

In one embodiment, a circuit to increase the backscatter level of an RFID chip (tag) is presented. The backscatter level is primarily affected by the interrogator power received by the tag as well as by the input impedance of the tag. The operation of the circuit involves monitoring a power level received by the tag and changing the input impedance presented to the tag using the power level information to increase the backscatter level reflected back to an interrogator when the tag communicates with the interrogator. That is, the input impedance of the tag is adjusted based on the received RF power level. Generally, a non-linearity of the tag can cause decrease of the backscatter level in response to increase of the input RF power. The methods and apparatuses as described herein advantageously compensate for a decrease in the backscatter level of the tag associated with the non-linearity of the tag by adjusting the input impedance of the tag based on the monitored input power. Additionally, the methods and apparatuses as described herein provide an advantage of increasing a signal to noise ratio of the backscatter signal by adjusting the input impedance of the tag based on the monitored input power. Furthermore, the methods and apparatuses as described herein advantageously improve Received Signal Strength Indicator (RSSI) detection of the RFID interrogator by adjusting the input impedance of the tag based on the monitored input power. Furthermore, the embodiments as described herein advantageously provide control over the rate of change of the reflection coefficient associated with the input impedance at varying RF input power levels, as described in further detail below.

Figure 1:
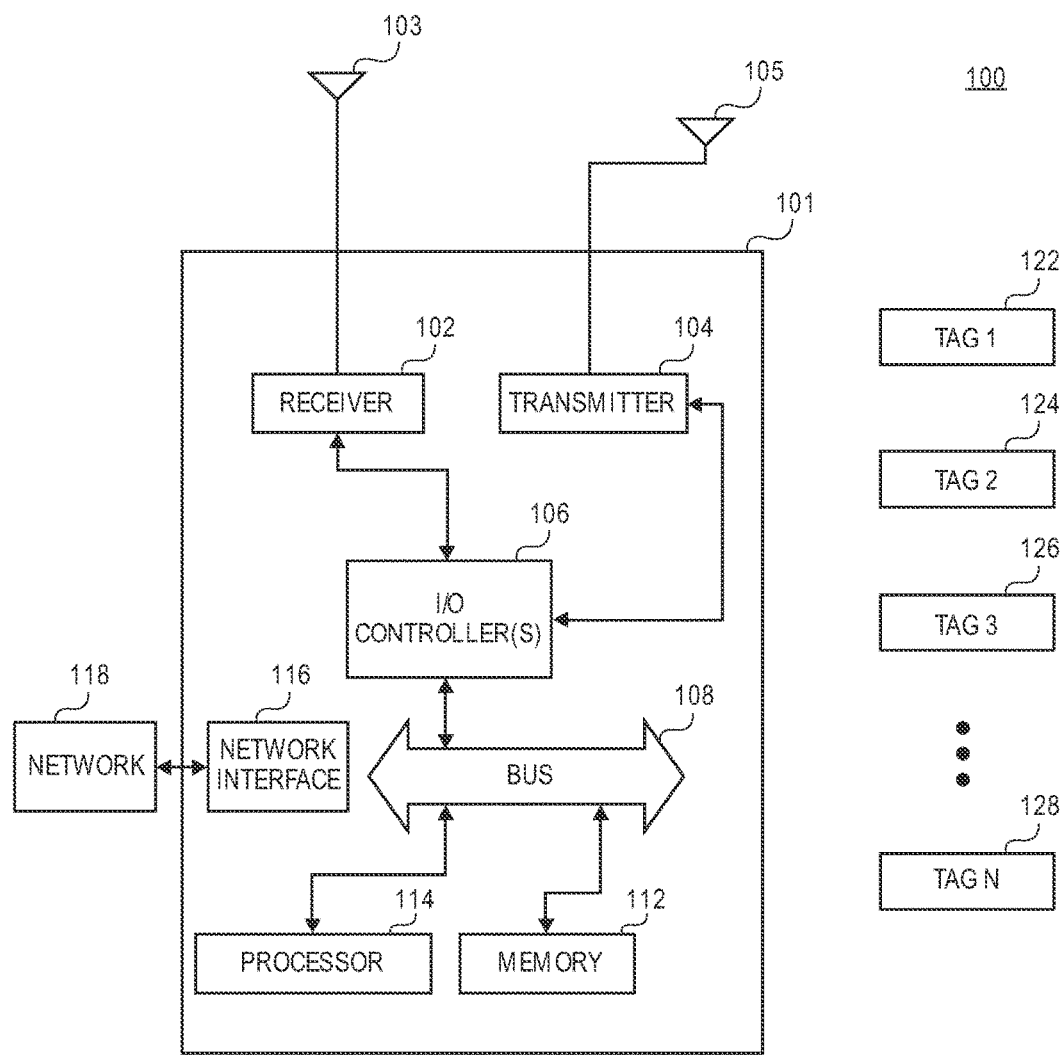
FIG. 1 illustrates one embodiment of an identification system that includes an reader and a plurality of RFID tags.

FIG. 1 illustrates an example of an RFID system 100 which includes a interrogator 101 and a plurality of tags 122, 124, 126 and 128 according to one embodiment of the invention. In one embodiment, the interrogator 101 comprises an RFID reader. In another embodiment, the interrogator 101 comprises a reader and a programmer. In one embodiment, the RFID system 100 is a reader-talks first RFID system. In one embodiment, at least one of the plurality of tags 122, 124, 126 and 128 is a passive or a semi-passive active backscatter transponders as tags. The incorporation of a battery into a tag is an expanded feature to facilitate longer read range; however, the use of the battery does require certain trade-offs, such as higher costs, limited longevity, larger form factor, greater weight and end-of-life disposal requirements. Thus, the tags 122, 124, 126 and 128 may have a battery or not. It will be appreciated that different types of tags may be mixed in a system where a reader is interrogating tags with batteries and tags without batteries. There are at least 4 classes of tags which may be used with embodiments of the present invention: (I) no power source on the tag except for power which is obtained from the tag's antenna, and includes one-time programmable memory which can store the tag's identification code and may include factory programmed memory, (II) a tag without a power source on the tag except for power which is obtained from the tag's antenna, but when powered from the reader, can write, erase, or rewrite data to non-volatile memory in the tag; this type of tag may also include one time programmable memory, and the tag's identification code can be in any of these memories; (III) a tag with a small battery to provide power to the circuitry in the tag. Such a tag may also include a non-volatile memory as well as storing the tag's identification code or other data, and other types of memory such as factory programmed memory and write once memory, and (IV) a tag which can communicate with other tags or other devices.

The interrogator 101 typically includes a receiver 102 and a transmitter 104, each of which is coupled to an I/O (input/output) controller 106. The receiver 102 has an antenna 103, and the transmitter 104 has an antenna 105. It will be appreciated by those ordinary skill in the art that the transmitter 104 and the receiver 102 may share the same antenna. The receiver 102 and the transmitter 104 can be similar to conventional receiver and transmitter units found in current readers. The receiver and transmitter typically operate, in North America, in a frequency range of about 900 megahertz (MHz). In other embodiments, the range is about 2400 MHz. It will be appreciated, however, that the operation of the RFID system disclosed herein is not dependent upon the specific operating frequency. The receiver and transmitter are coupled to the I/O controller 106 that controls the receipt of data from the receiver 102 and the transmission of data, such as commands or programming data or other data, from the transmitter 104. The I/O controller 106 is coupled to a bus 108 that is in turn coupled to a processing unit 114 and a memory 112. In alternative embodiments, processing unit 114 is a microcontroller, a finite state machine, a logic array, a processing logic, other processor, or any combination thereof. In one implementation, the a processing unit 114 is a programmable microcontroller, such as an 8051 microcontroller or other well-known microcontrollers or microprocessors (e.g., an ARM microprocessor) and the memory 112 includes a dynamic random access memory and a memory controller that controls the operation of the memory. Memory 112 may also include a non-volatile read only, a re-writable non-volatile memory (e.g. flash memory), or both for storing data and software programs. The memory 112 typically contains a program that controls the operation of the processing unit 114 and also contains data used during the processing of tags as in the interrogation of tags. In one embodiment, the memory 112 includes a computer program which causes the processing unit 114 to send commands through the I/O controller 106 to the transmitter 104 and to receive responses from the tags through the receiver 102 and through the I/O controller 106. The interrogator 101 may also include a network interface 116, such as an Ethernet interface, which allows the interrogator 101 to communicate to other processing systems through a network 118 (which can be a wired or wireless network or a combination of both wired and wireless networks). In one embodiment, the network interface 116 is coupled to the bus 108 to receive data, e.g., the list of tags identified in an interrogation from the processing unit 114, the memory 112, or both.

Figure 2:
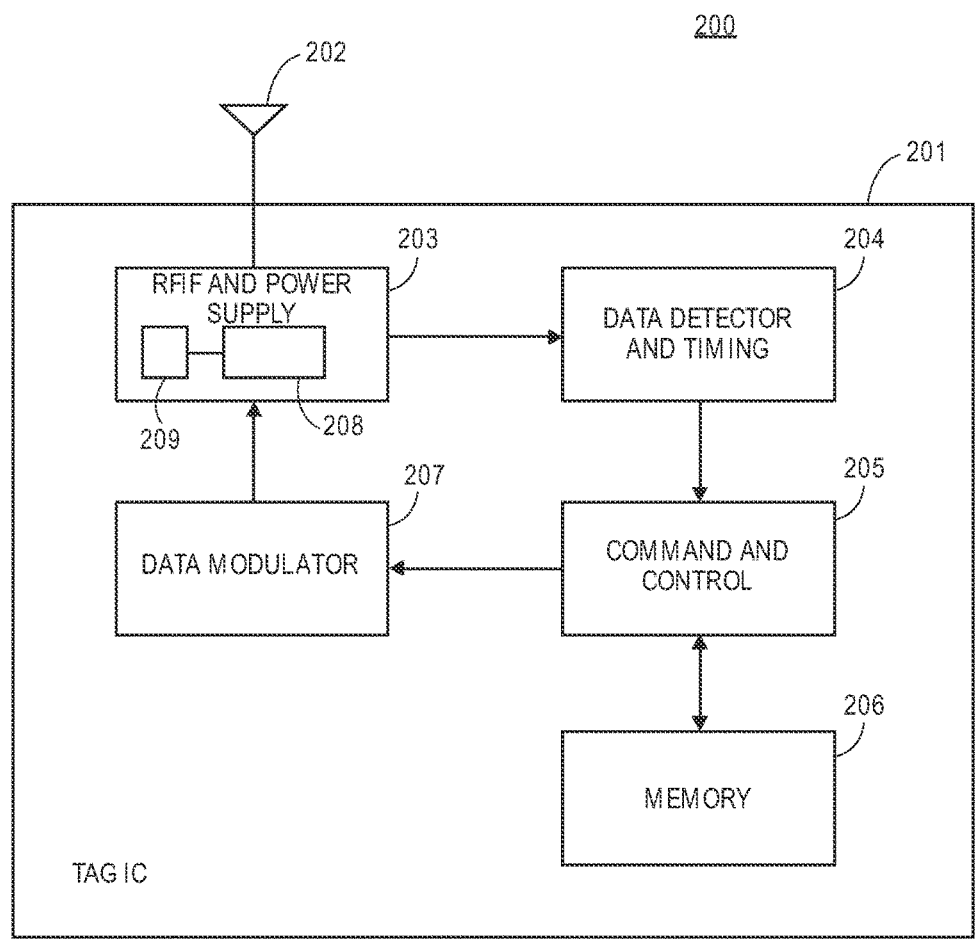
FIG. 2 illustrates an example of an RFID tag according to one embodiment of the present invention.

FIG. 2 illustrates an example of an RF tag according to one embodiment of the invention. In one embodiment, tag 200 represents one of the tags depicted in FIG. 1. In one embodiment, a tag 200 includes an antenna 202 connected to an integrated circuit (IC) 201. The IC 201 can implement a command protocol and can contain the tag's identity code, which may be an electronic product code (EPC). The antenna 202 receives interrogation signals and sends a response back to the interrogator 101 (during a backscatter mode) as a backscatter signal modulated using the tag's data. The tag IC 201 comprises an RF interface (RFIF) and power supply unit 203, a data detector and timing circuit unit 204, a command and control unit 205, a data modulation unit 207 and a memory 206. In one embodiment, command and control unit 205 includes a logic which controls data modulation unit 207 based on commands received from the interrogator. In one embodiment, data modulation unit 207 comprises a backscatter modulator. In one embodiment, the backscatter modulator, under control of the control unit 205, modulates the input impedance of the tag to provide responses or other data through the antenna 202 to the interrogator. It will be appreciated by those in the art that the modulation of the impedance of the IC chip to the antenna 201 will result in changes of the reflection of the RF power at the interrogator which can be demodulated to extract the data sent by the tag.

As shown in FIG. 2, the RF interface and power supply unit 203 comprises an RF-DC rectifier 208 that converts the RF power into the DC power to operate the tag 200 and a controller circuit 209 to perform methods to increase a backscatter level of the tag, as described herein. In one embodiment, the RF interface and power supply unit 203 provides modulation information to the data detector and timing unit 204. The data detector and timing unit 204 de-modulates the interrogator signals and generates timing and data signals used by the command and control unit 205. The RF interface 203 couples the tag modulation signals to the antenna 202 for transmission to the interrogator. The command and control logic unit 205 may include a logic to interpret data from the interrogator, perform the required internal operations and determine if the tag will respond to the interrogator. Examples of how and when a tag responds are provided in U.S. Pat. Nos. 8,102,244 and 7,716,160 that are incorporated herein by reference.

In one embodiment, tag memory 206 contains the EPC code of the item tagged by the tag. In one embodiment, tag memory 206 contains a unique identification code, a non-unique identification code, or both. In one embodiment, tag memory 206 can contain a checksum that may be used for error detection. The data modulator 207 translates the binary tag data into a signal that is then applied to the RF interface 203 and then transmitted via the antenna 202 to the interrogator 101.

Various different implementations of tags can be used with embodiments of the present invention. It is understood that the implementations of the tags are not limited to the examples shown in this description. Different tags or interrogator devices can use methods of the embodiments of the present invention for communication according to the needs of the target application. In one embodiment, the tag is fabricated using a fluidic self-assembly process, a pick and place process, or other processes known to one of ordinary skill in the art of RFID device manufacturing.

Figure 3A:
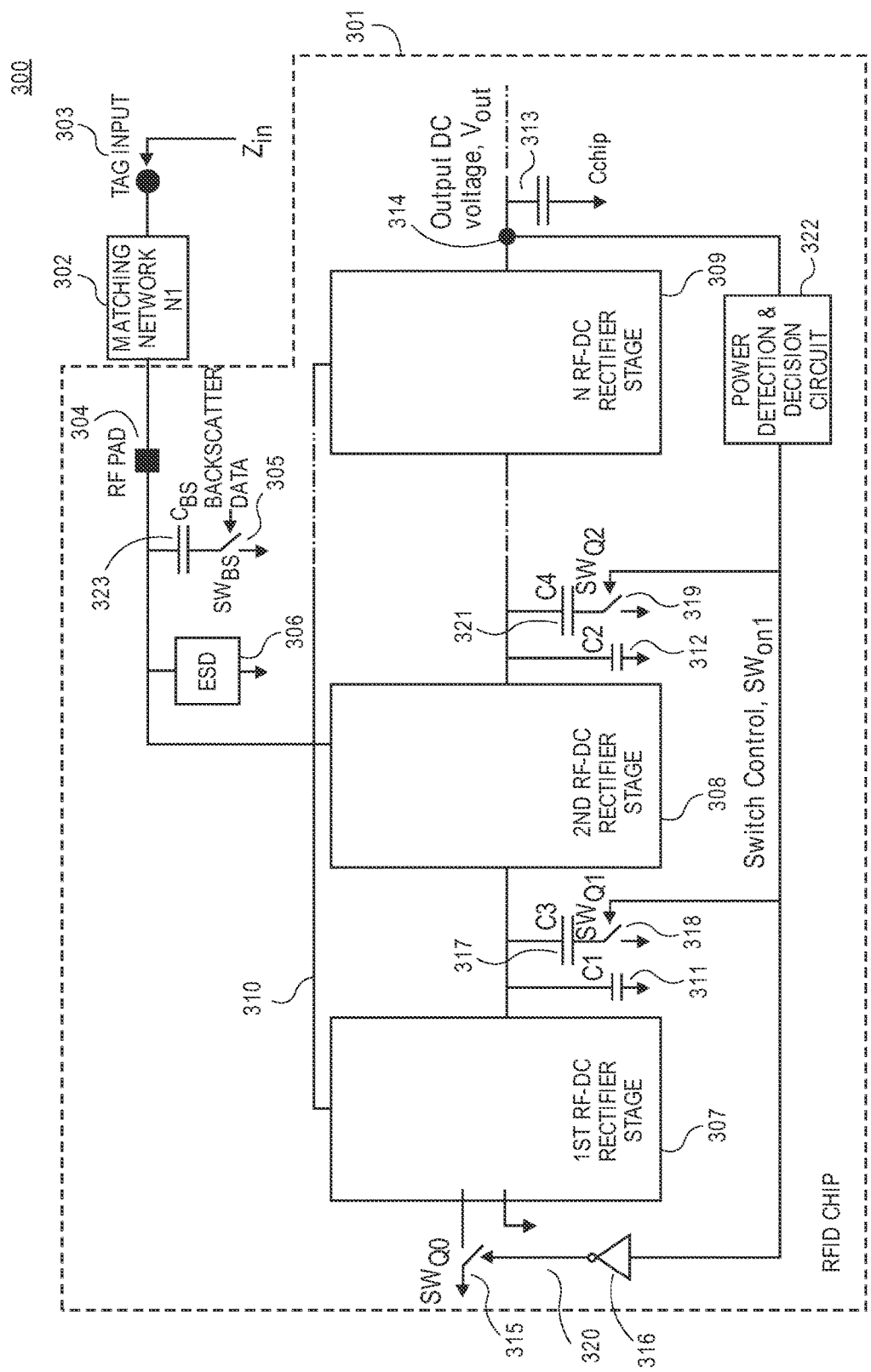
FIG. 3A shows a circuit to increase a backscatter level of an RFID tag according to one embodiment of the invention.

FIG. 3A shows a circuit 300 to increase a backscatter level of an RFID tag according to one embodiment of the invention. In one embodiment, circuit 300 represents a portion of one of the tags depicted in FIG. 1. In one embodiment, circuit 300 represents a portion of the RF interface and power supply unit 203. Circuit 300 comprises an RFID chip 301 coupled to a matching network N1 302 coupled to a tag input 303. Matching network 302 is coupled to an RF-DC rectifier 310 via an RF pad 304 on RFID chip 301. The function of the matching network N1 302 is to maximize the power transfer from the tag input 303 to RF pad 304 by modifying the impedance looking to the right of the matching network N1 302 at RF PAD 304 such that it is the complex conjugate of the impedance looking to the left of the matching network N1 302 at RF PAD 304. A backscatter capacitor $C_{BS}$ 323 is connected to a link between RF pad 304 and RF-DC rectifier 310 and is connected to a backscatter data switch $SW_{BS}$ 305 connected to a ground.

Generally, an RFID tag communicates with an interrogator using backscatter modulation, in which the RFID tag changes the reflection coefficient of the antenna in accordance with the backscatter data sent. In one embodiment, during backscatter, an input impedance of the tag, e.g., the impedance $Z_{in}$ at the tag input 303, is changed depending on the state (e.g., "ON" or "OFF") of the switch (e.g., $SW_{BS}$ 305), which is controlled by the backscatter data to be sent to the interrogator. When the switch $SW_{BS}$ is in the OFF state, the capacitor $C_{BS}$ does not contribute to the RFID tag input impedance $Z_{in}$. The capacitor $C_{BS}$ is shunted to ground when the switch $SW_{BS}$ is in the ON state, so that the RFID tag input impedance $Z_{in}$ is changed. That is, the reflection coefficient of the RFID tag changes from a first value, when switch $SW_{BS}$ is in the OFF state, to a second value when $SW_{BS}$ is in the ON state, where the second value is greater than the first value.

As shown in FIG. 3A, an electrostatic discharge (ESD) unit 306 is connected to a link between RF pad and RF-DC rectifier 310 and is connected to the ground. The ESD unit 306 can be a conventional ESD protection circuit designed to protect the IC of the RFID tag from electrostatic discharge. RF-DC rectifier 310 comprises a plurality of RF-DC rectifier stages, such as a first RF-DC rectifier stage 307, a second RF-DC rectifier stage 308 and a $N^{th}$ RF-DC rectifier stage 309, where N can be any number greater than or equal to one. In one embodiment, first RF-DC rectifier stage 307, second RF-DC rectifier stage 308 and $N^{th}$ RF-DC rectifier stage 309 are connected in parallel, as shown in FIG. 3A. A capacitor $C_1$ 311 is connected to a link between the first RF-DC rectifier stage 307 to second RF-DC rectifier stage 308 and to a ground reference node. A capacitor $C_2$ 312 is connected to a link between the second RF-DC rectifier stage 308 and third RF-DC rectifier stage 309 and to the ground reference node. As shown in FIG. 3A, RF-DC rectifier 310 outputs a DC voltage $V_{out}$ at an output 314. As shown in FIG. 3A, a chip decoupling capacitor $C_{chip}$ 313 is coupled between the output 314 and the ground reference node. In one embodiment, each of the stages of the RF-DC rectifier 310 comprises one or more capacitors coupled to one or more transistors. In one embodiment, the RF-DC rectifier stages 307, 308 and 309 can have similar circuitry. In another embodiment, the RF-DC rectifier stages 307, 308 and 309 can have different circuitry. In one embodiment, each stage of the RF-DC rectifier 310 is represented by a parallel resistor coupled to a ground. In one embodiment, the RF-DC rectifier 208 represents the RF-DC rectifier 310. In one embodiment, at least a portion of the RF-DC rectifier can be implemented as described in the U.S. Pat. No. 8,395,505 incorporated herein by reference.

As shown in FIG. 3A, a quench circuit 320 comprising a plurality of switches, such as a switch $SW_{Q0}$ 315, a switch $SW_{Q1}$ 318 and a switch $SW_{Q2}$ 319 is coupled to the RF-DC rectifier 310. In one embodiment, the input impedance Z of the DC-RF rectifier 310 decreases as the received input RF power increases. In one embodiment, a set of switches are used to cut off or bypass one or more stages of the RF-DC rectifier when the input RF power is greater than a predetermined threshold to compensate for a decrease of the RF-DC rectifier input impedance. Switch $SW_{Q1}$ 318 is connected to the link between the first RF-DC rectifier stage 307 and the second RF-DC rectifier stage 308 via a capacitor $C_3$ 317. Switch $SW_{Q2}$ 319 is connected to the link between the second RF-DC rectifier stage 308 and the $N^{th}$ RF-DC rectifier stage 309 via a capacitor $C_4$ 321. In one embodiment, the capacitors $C_3$ is greater than capacitor $C_1$. In one embodiment, capacitor $C_4$ is greater than capacitor $C_2$. As shown in FIG. 3A, a power detection and decision circuit 322 is connected to $SW_{Q0}$ 315 via an inverter 316. The inverter 316 inverts the signal driving the gate of switch 318 so that when switch 318 is ON then switch 315 is OFF (opened). The power detection and decision circuit 322 is also connected to the switches $SW_{Q1}$ 318 and $SW_{Q2}$ 319. The power detection and decision circuit 322 is connected to the output 314 of the RF-DC rectifier 310. In one embodiment, the power detection and decision circuit 322 is a controller circuit configured to monitor an input power on the tag and to adjust an input impedance of the tag based on the monitored input power to increase a backscatter level of the tag. In one embodiment, adjusting the input impedance of the tag based on the monitored input power involves adjusting the input impedance of the tag, if the input power level is greater than the predetermined level, as described in further detail below.

Figure 3B:
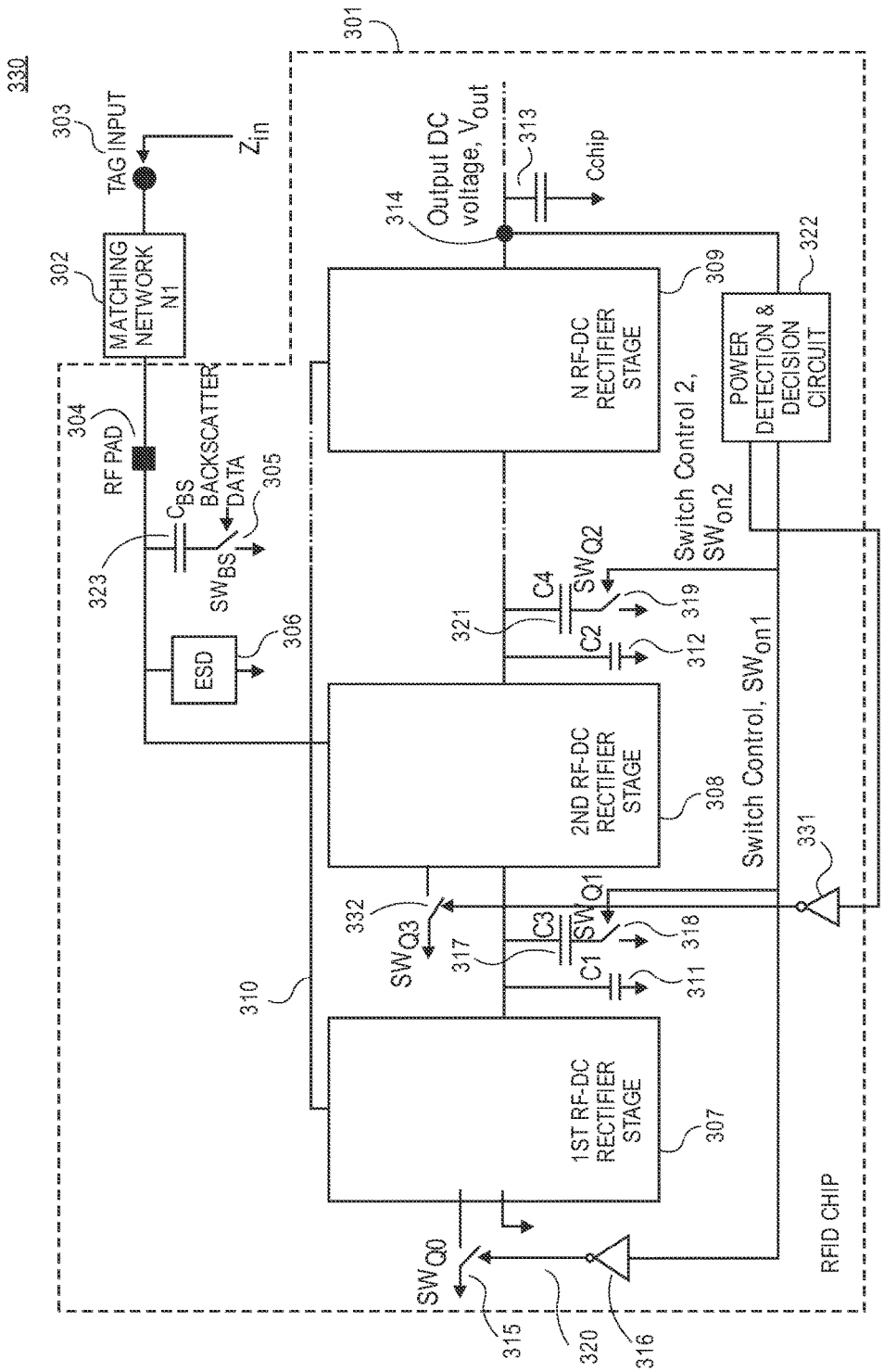
FIG. 3B shows a circuit to increase a backscatter level of an RFID tag according to another embodiment of the invention.

FIG. 3B shows a circuit 330 to increase a backscatter level of an RFID tag according to another embodiment of the invention. The circuit 330 is different from the circuit 300 in that the power detection and decision circuit 322 is additionally coupled to the second RF-DC rectifier stage 308 via an inverter 331 and a switch $SW_{Q3}$ 332. In this embodiment, the first and second RF-DC rectifier stages are bypassed with the appropriate application of switch control signals, $SW_{on1}$ and $SW_{on2}$2, at predetermined power levels $P_1$ and $P_2$ respectively. In one embodiment, power level $P_2$ is greater than power level $P_1$. When the input power level exceeds power level P1, switch control signals $SW_{on1}$ and $SW_{on2}$ are in the ON and OFF states respectively. This results in the switches $SW_{Q1}$ 318, $SW_{Q2}$ 319, $SW_{Q3}$ 332 to be in the ON state and $SW_{Q0}$ to be in the OFF state. When the input power level exceeds power level P2, switch control signals $SW_{on1}$ and $SW_{on2}$ are both in the ON state, resulting in $SW_{Q0}$, $SW_{Q1}$, $SW_{Q2}$, and $SW_{Q3}$ to be in the ON state.

Figure 6:
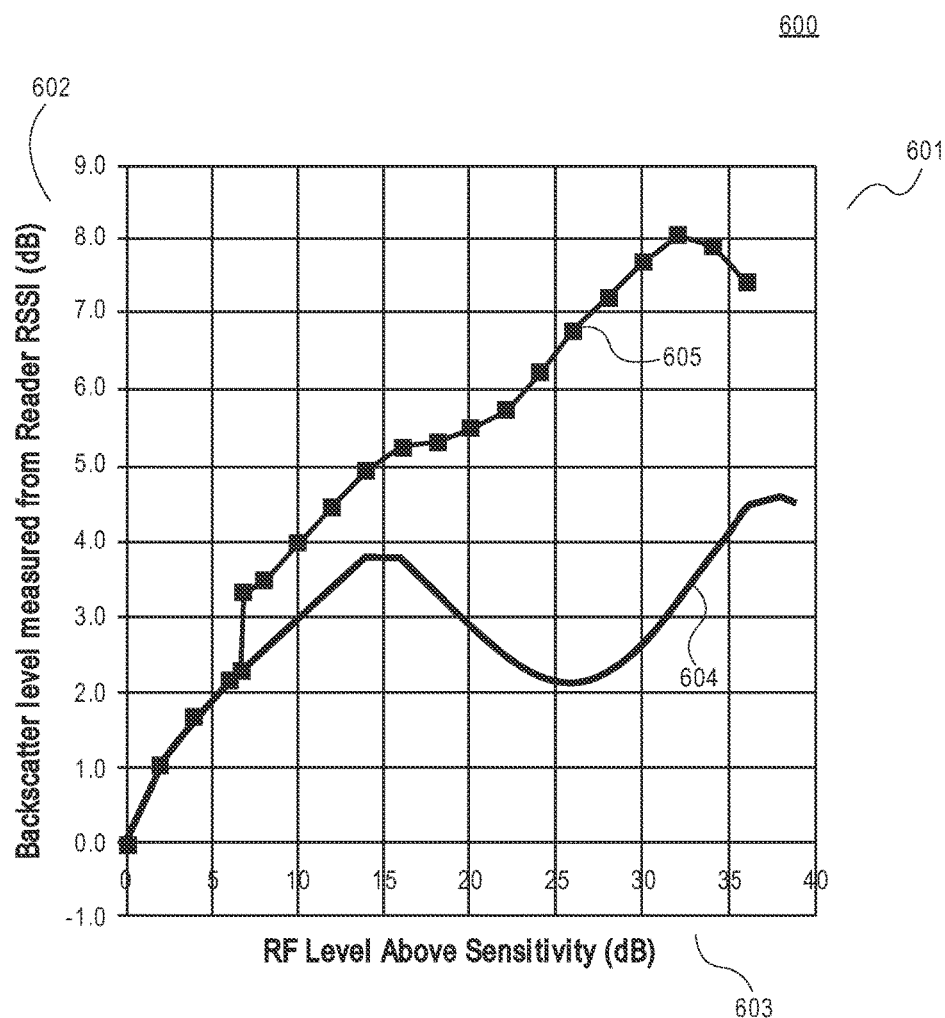
FIG. 6 is a view of a graph illustrating a measured backscatter level of the tag as a function of the interrogator RF power level according to one embodiment of the invention.
Figure 7:
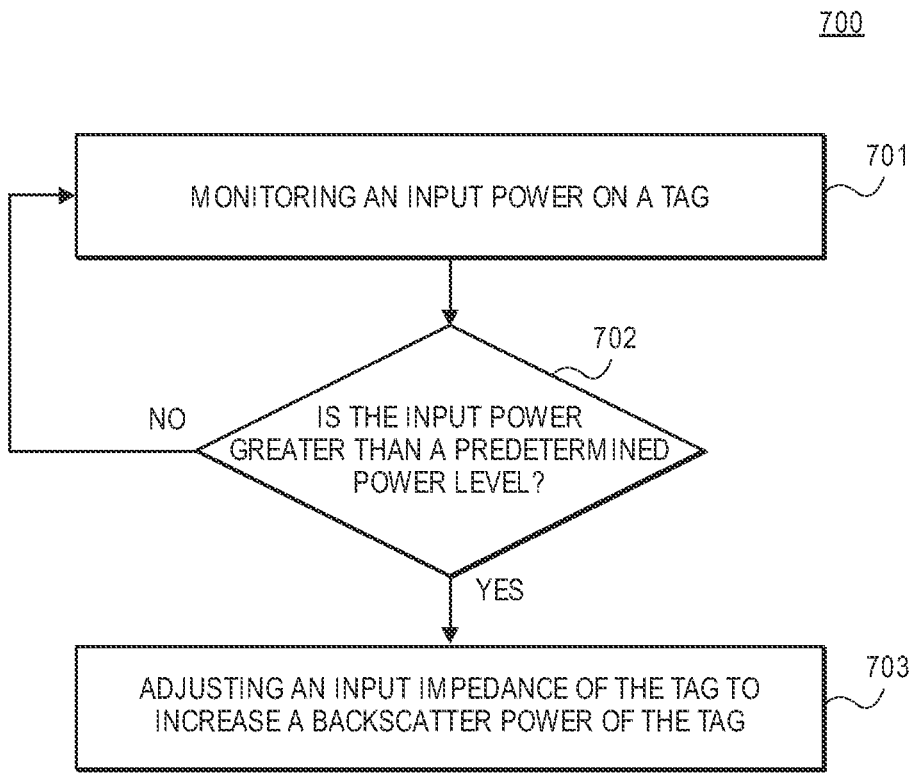
FIG. 7 shows a flowchart representation of one embodiment of a method to operate a tag.

FIG. 7 shows a flowchart representation of one embodiment of a method 700 to operate a tag. Method 700 starts at operation 701 that involves monitoring an input power supplied to the tag. In one embodiment, monitoring the input RF power involves monitoring the voltage at the output of the RF-DC rectifier, such as output voltage $V_{out}$ 314. In one embodiment, $V_{out}$ 314 is a function of the input RF power provided from the interrogator to the tag input, such as tag input 303. In one embodiment, monitoring the input RF power involves sampling the DC output voltage $V_{out}$; and determining an output current of the rectifier device based on the output voltage. In one embodiment, determining the output current of the rectifier device involves converting the output DC voltage to current. At operation 702 it is determined if the input power is greater than a predetermined power level. If the input power is not greater than the predetermined power level, method 700 returns back to operation 701. If the input power is greater than the predetermined power level, at operation 703 the input impedance of the tag is adjusted to increase a backscatter power level of the tag (by, for example, bypassing one or more stages in the multi-stage rectifier, as shown in FIGS. 3A and 3B). In one embodiment, the power level at which the input impedance of the tag needs to be adjusted is determined by design. FIG. 6 shows one embodiment of the predetermined power level, where at 8 dB above sensitivity, the power detection and decision circuit triggers and turns the corresponding switches to bypass one or more rectifier stages, resulting in a step increase in the backscatter level. It is understood that the predetermined power level is not limited to the example shown in this description. The choice of the predetermined power level depends on the accuracy and variation of the power detection and decision circuit as well as the targeted backscatter level improvement.

Figure 4:
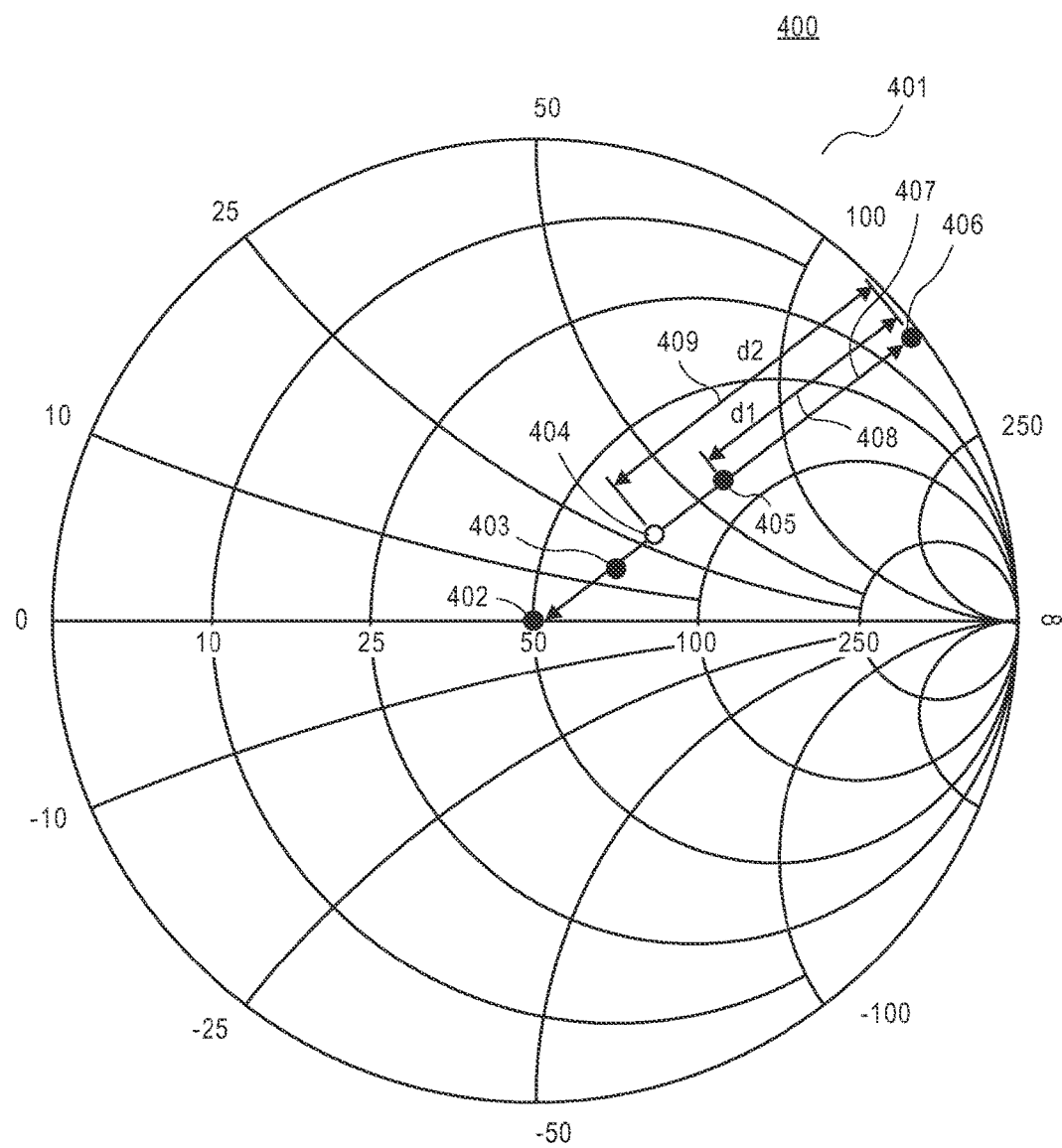
FIG. 4 is an exemplary graph illustrating a change of a reflection coefficient according to one embodiment of the invention.

FIG. 4 is an exemplary graph 400 illustrating a change of a reflection coefficient 401 of the tag as a function of the interrogator RF power level and the effect of the reflection coefficient change on a backscatter level of the tag according to one embodiment of the invention. As shown in FIG. 4, the reflection coefficient between two switch states during backscatter changes as the input RF power level changes. As shown in FIG. 4, the reflection coefficient of the RFID tag varies with interrogator RF power level. The backscatter level is proportional a difference between the reflection coefficient of the tag when the backscatter data switch $SW_{BS}$ (e.g., $SW_{BS}$ 305) is in the OFF state (e.g., point 402) and the reflection coefficient of the tag when the backscatter data switch $SW_{BS}$ is in the ON state (e.g., a point 406). In the graph 400, the difference between these two reflection coefficients is shown as a distance d (e.g., a distance 407). For example, at a first input RF power P1 the reflection coefficient of the tag when the backscatter data switch $SW_{BS}$ is in the OFF state is represented by a point 402 on the graph 400. Point 402 corresponds to a first input impedance Zoff1. At a second input RF power P2 greater than the first input RF power P1 the reflection coefficient of the tag when the backscatter data switch $SW_{BS}$ is in the OFF state is represented by a point 403. Point 403 corresponds to a second input impedance Zoff2. At a third input RF power P3 greater than the second input RF power P2 the reflection coefficient of the tag when the backscatter data switch $SW_{BS}$ is in the OFF state is represented by a point 405. Point 405 corresponds to a third input impedance Zoff3. As shown in FIG. 4, as the input RF power increases, the difference (distance) between the reflection coefficient of the tag when the backscatter data switch $SW_{BS}$ is in the OFF state and the reflection coefficient of the tag when the backscatter data switch $SW_{BS}$ is in the ON state decreases as the tag input impedance when the $SW_{BS}$ is in the OFF state varies with the RF power level in the manner, as shown in FIG. 4. When the rate of decrease of this distance occurs at a faster rate than the rate of increase of the input RF power level, the backscatter level of the tag will be observed to decrease, as illustrated by a curve 604 depicted in FIG. 6.

Generally, in a passive RFID tag, a RF-DC rectifier is used to collect the RF energy from the interrogator and to convert this RF energy to a DC voltage supply (e.g., a DC voltage $V_{out}$ at an output 314) for the circuits within the RFID tag to process the information from the interrogator and to backscatter an appropriate response to complete the communication between the interrogator and RFID tag. These RF-DC rectifiers are often cascaded into stages depending on the operating voltage and current requirements of the RFID tag. Typically, the input impedance Zin of the RFID tag changes with changing the input RF power level because of the non-linearity of the RF-DC rectifier.

Referring back to FIGS. 3A and 4, quench circuit 320 is used to increase the backscatter level of the tag. At low RF power levels (e.g., power level P1), the power detection and decision circuit 322 sends a control signal to maintain the switch controls $SW_{ON1}$ in the ON state. This results in the switches $SW_{Q1}$, $SW_{Q2}$ to be in the ON state and $SW_{Q0}$ to be in the OFF state. In this case, all stages of the RF-DC rectifier 310 are available to the RFID tag and contribute to the input impedance. When the input RF power level is greater than a predetermined power level, e.g., at power level P2 or P3, the power detection and decision circuit 322 sends a control signal to switch control $SW_{ON1}$ to the OFF state, resulting in switches $SW_{Q1}$, $SW_{Q2}$ to be in the OFF state and $SW_{Q0}$ to be in the ON state. This action bypasses the 1st rectifier stage 307 of a total of N stages, so that the input impedance of the tag is changed. The input impedance increases as a result of bypassing one or more stages of the rectifier, and this increase in input impedance compensates for the decrease in input impedance that results from an increase in received RF power. The change in the input impedance causes the change in the reflection coefficient of the tag from the reflection coefficient represented by point 405 to the reflection coefficient represented by a point 404 in FIG. 2. The change in the input impedance increases the distance d between the reflection coefficient of the tag when the backscatter data switch $SW_{BS}$ is in the OFF state and the reflection coefficient of the tag when the backscatter data switch $SW_{BS}$ is in the ON state. As shown in FIG. 4, a distance d2 409 between point 406 and point 404 is greater than a distance d1 408 between point 406 and point 405. In alternative embodiments, more than one RF-DC rectifier stages are bypassed as the input RF power level is further increased.

Figure 8:
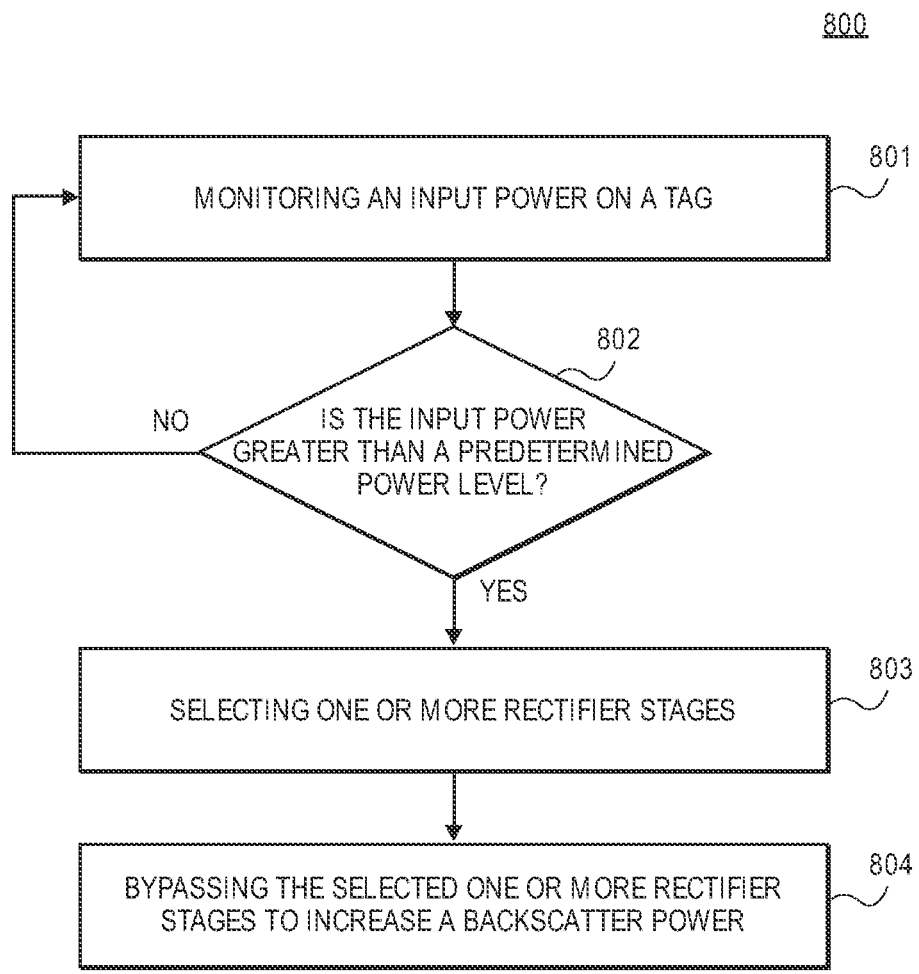
FIG. 8 shows a flowchart representation of one embodiment of a method to increase a backscatter level of a tag.

FIG. 8 shows a flowchart representation of one embodiment of a method 800 to increase a backscatter level of a tag. At operation 801 an input RF power level on a tag is monitored, as described above. At operation 802 it is determined whether the input power level is greater than a predetermined power level. If the input RF power level is not greater than the predetermined power level, method 800 returns to operation 801. If the input RF power level is greater than the predetermined power level, one or more rectifier stages are selected, as described above. At operation 804 the selected one or more rectifier stages are bypassed to increase a backscatter power level of the tag, as described above.

Figure 9:
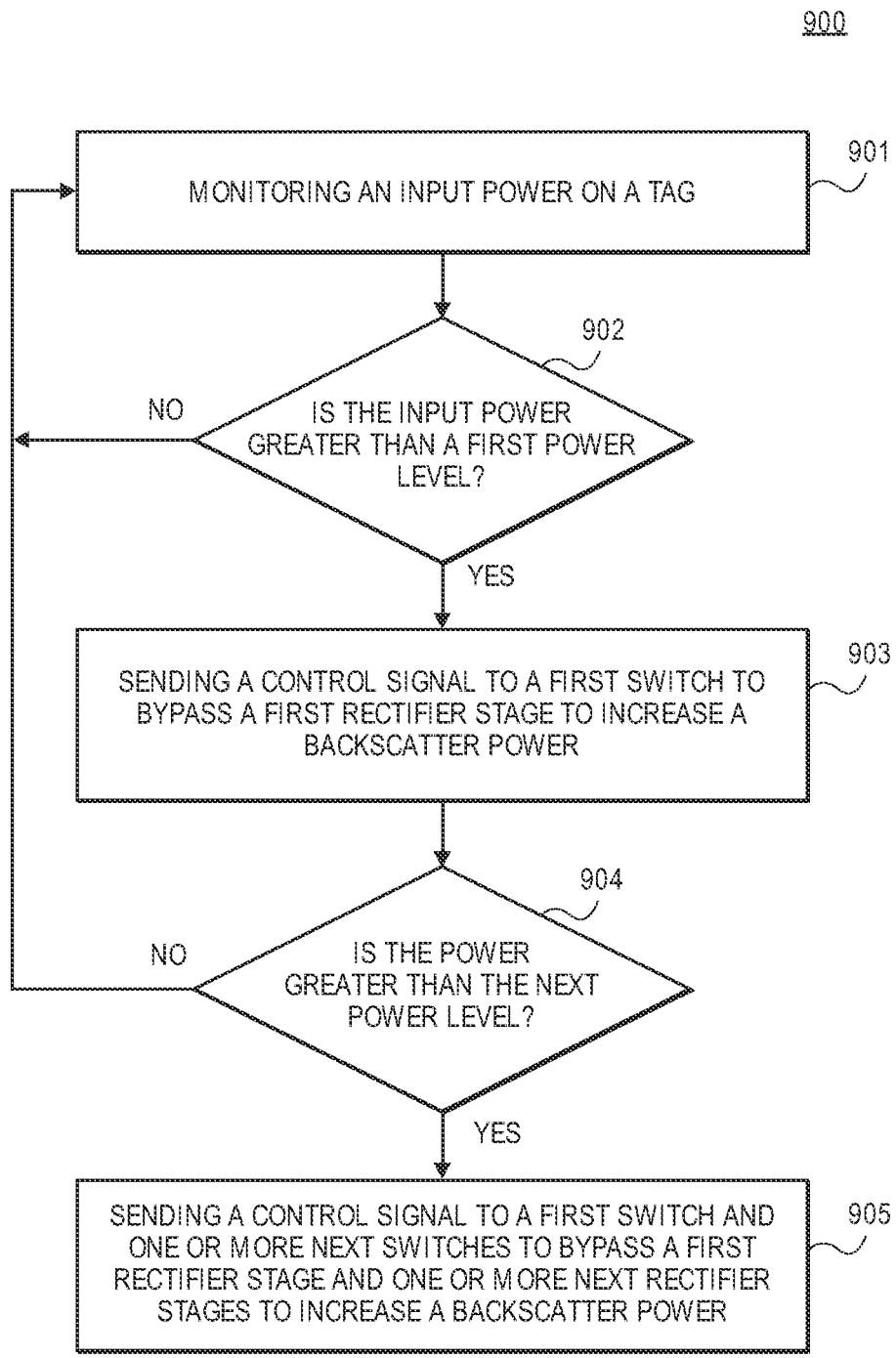
FIG. 9 shows a flowchart representation of one embodiment of a method to increase a backscatter power level of the tag.

FIG. 9 shows a flowchart representation of one embodiment of a method 900 to increase a backscatter power level of the tag. At operation 901 an input RF power level on a tag is monitored, as described above. At operation 902 it is determined if the input power level is greater than a predetermined power level, as described above. If the input RF power level is not greater than the predetermined power level, method 900 returns back to operation 901. In one embodiment, if the input RF power level is not greater than the predetermined RF power level, the power detection and decision circuit 322 maintains the switch control signal $SW_{ON1}$ in the ON state to keep switches $SW_{Q1}$ and $SW_{Q2}$ in the ON state and switch $SW_{Q0}$ in the OFF state so that all rectifier stages contribute to the input impedance of the tag. If the input RF power level is greater than the predetermined power level, at operation 903 a control signal is sent to at least a first quench circuit switch to bypass a first rectifier stage (e.g., RF-DC rectifier stage 307) to increase a backscatter power, as described above. In one embodiment, the power detection and decision circuit 322 turns the switch control signal $SW_{ON1}$ to the OFF state to turn switches $SW_{Q1}$ and $SW_{Q2}$ in the OFF state and switch $SW_{Q0}$ in the ON state to bypass the first RF-DC rectifier stage (e.g. stage 307) to change the input impedance of the tag. In one embodiment, bypassing the one or more RF-DC rectifier stages increases the input impedance of the tag to increase the backscatter power level. In one embodiment, bypassing the one or more RF-DC rectifier stages changes the input impedance of the tag as marked by point 404 in FIG. 4. Point 404 represents the reflection coefficient of the tag at a third input RF power P3 greater than the second input RF power P2 when the backscatter data switch $SW_{BS}$ is in the OFF state, and $SW_{Q1}$ and $SW_{Q2}$ are in ON state, and $SW_{Q0}$ is in OFF state. In one embodiment, bypassing the one or more RF-DC rectifier stages increases a signal to noise ratio of the backscatter power level.

At operation 904 it is determined if the input RF power is greater than a next power level. In one embodiment, the next power level is greater than the first power level. If the input RF power is not greater than the next power level, method 900 returns back to operation 901. If the input RF power level is greater than the next power level, at operation 905 a control signal is sent to the first quench circuit switch and one or more next quench circuit switches to bypass the first rectifier stage and one or more next rectifier stages to increase a backscatter power level of the tag. That is, the higher the input RF power the more stages of the RF-DC rectifier can be bypassed to increase the input impedance to compensate for a decrease in the input impedance of the tag and to increase the backscatter power level. In one example, increasing backscatter level for the RFID tag as described herein is used for any distance between the reader and tag. In more specific example, increasing backscatter level for the RFID tag as described herein is used for a distance from about 1 foot to about 6 feet.

Figure 5:
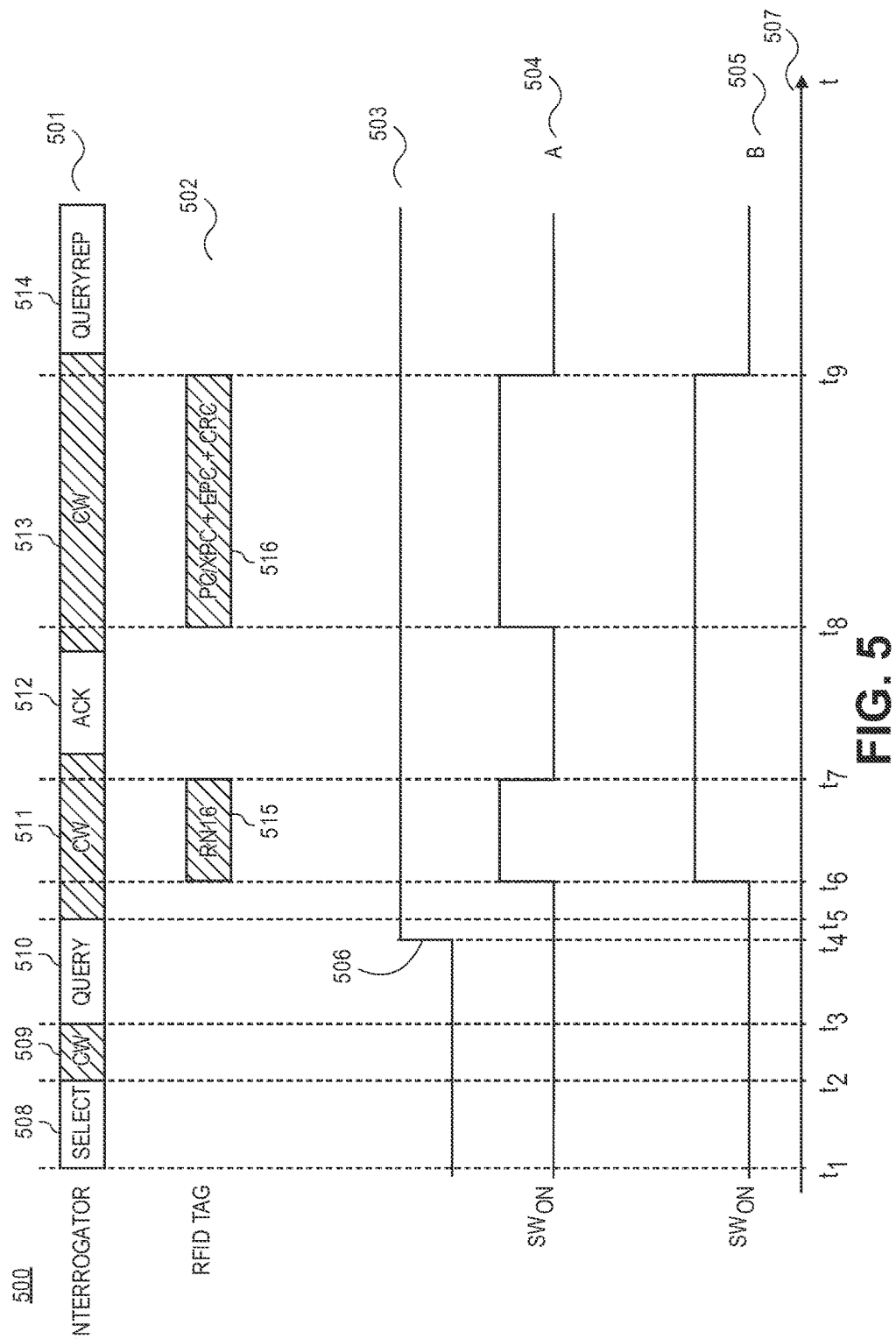
FIG. 5 shows an exemplary timing diagram of an apparatus to increase backscatter level for the RFID tag according to one embodiment of the invention.

FIG. 5 shows an exemplary timing diagram 500 of an apparatus to increase backscatter level for the RFID tag according to one embodiment of the invention. Timing diagram 500 shows the blocks associated with the interrogator operations, signals, or commands 501, RFID tag operations 502, a power detection signal 503 over a time 507. FIG. 5 illustrates a switch control signal $SW_{ON}$ 504 over time 507 according to one embodiment (A) and a switch control $SW_{ON}$ signal 505 over time 507 according to another embodiment (B). In one embodiment, the interrogator operations 501 and RFID tag operations 502 are part of an RFID communication protocol.

At time t1 the interrogator sends an RF power signal to select a tag at a select block 508. At time t2 the interrogator sends a carrier wave (CW) signal to allow the tag to backscatter at a CW block 509. If the backscatter signal from the tag is received, the interrogator at time t3 sends handshake data (e.g., a16 bit random number) to the tag at a query block 510.

At time t4 a power detection signal 503 sent to the power detection and decision circuit transitions to a high (HI) state 506, if the input RF power exceeds a predetermined threshold. In one embodiment, power detection signal 503 is internal to the RFID tag. At time t5 the interrogator sends a carrier wave (CW) signal to allow the tag to backscatter at a CW block 511. At time t6 a switch control signal $SW_{ON}$ 504 sent from the power detection and decision circuit to the quench circuit transitions to a high state "HI" to bypass one or more rectifier stages and the RFID tag sends the handshake data (e.g., 16-bit random number) back to the interrogator at an RN 16 block 515 while the one or more rectifier stages are bypassed to compensate for the reduction in input impedance due to the input RF power exceeding the predetermined threshold.

At time t7 switch control signal $SW_{ON}$ 504 transitions back to a low state ("LOW") after the tag sends the handshake data according to one embodiment (A). In response to receiving the 16-bit random number from the tag, the interrogator sends an acknowledgment signal to the tag at an acknowledgment operation 512 and sends a CW to allow the tag to backscatter tag information data at a CW block 513. At time 8 switch control signal $SW_{ON}$ 504 transitions to HI state to bypass one or more rectifier stages and the tag sends the tag information (e.g., PC/XPC bits, electronic product code (EPC), cyclic redundancy check (CRC), or other tag information) to the interrogator at an operation 516 while the one or more rectifier stages are bypassed to compensate for the reduction in input impedance due to the input RF power exceeding the predetermined threshold. At time t9 switch control signal $SW_{ON}$ 504 goes back to a low state ("LOW") after operation 516 is performed.

In another embodiment (B), at time t6 a switch control signal $SW_{ON}$ 505 sent from the power detection and decision circuit transitions to a high state "HI" to bypass one or more rectifier stages and the RFID tag sends the 16-bit random number to the interrogator at an RN 16 operation 515. As shown in FIG. 5, switch control signal $SW_{ON}$ 505 is maintained at the HI state during the entire transaction comprising operations 515, 512 and 513 from time t6 to time t9 according to another embodiment (B). Switch control signal $SW_{ON}$ 505 goes to LOW state at time 9 after the operation 516 is performed. In one embodiment, after CW block 513, the interrogator performs a queryrep operation 514 that involves repeating sending the query command to the tag according to the RFID communication protocol.

FIG. 6 is a view 600 of a graph 601 illustrating a measured backscatter level 602 of the tag as a function of the interrogator RF power level 603 according to one embodiment of the invention. A curve 605 shows the effect of the quench circuit on the backscatter level. A curve 604 shows the measured backscatter level of the tag versus the interrogator RF power level without using the quench circuit. As shown in FIG. 6, at the RF power levels less than 8 dB above sensitivity, the backscatter level with the quench circuit (curve 605) is similar to the one without the quench circuit (curve 604). At the RF power levels greater than 8 dB above sensitivity, the power detection and decision circuit triggers and turns the corresponding switches to bypass one or more rectifier stages, resulting in a step increase in the backscatter level. The increase in backscatter level becomes more pronounced at higher power levels with the quench circuit active, as shown in FIG. 6.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   monitoring an input power on a tag;
   selecting one or more rectifier stages on the tag; and
   bypassing the selected one or more rectifier stages to increase an input impedance of the tag, if the monitored input power is greater than a predetermined level; and
   increasing a backscatter level of the tag based on the increased input impedance.

2. The method of claim 1, further comprising
   determining if the input power is greater than the predetermined level.

3. The method of claim 1, further comprising
   sending a control signal to turn off a switch coupled to a rectifier stage of the tag.

4. The method of claim 1, wherein the input impedance is increased for a predetermined time, the predetermined time being at least one of a transaction time or a tag transmission time.

5. The method of claim 1, further comprising
   monitoring an output voltage on the tag to monitor the input power.

6. The method of claim 1, wherein the input impedance of the tag is modulated based on backscatter data when the tag is backscattering data to an RFID reader.

7. A method to increase a backscatter level of a tag comprising a rectifier device, the method comprising:
   monitoring an output voltage of the rectifier device;
   determining an input power to the tag based on the output voltage;
   selecting one or more rectifier stages; and
   bypassing the selected one or more rectifier stages to increase an input impedance of the tag, if the input power is greater than a first predetermined level; and
   increasing the backscatter level of the tag based on the increased input impedance.

8. The method of claim 7, further comprising
   sending a first control signal to a first switch coupled to the rectifier device, if the input power is greater than the first predetermined level; and
   sending a second control signal to a second switch coupled to the rectifier device, if the input power is greater than a second predetermined level.

9. The method of claim 7, wherein herein the input impedance is increased for a predetermined time, the predetermined time being at least one of a transaction time or a tag transmission time.

10. The method of claim 7, further comprising
    determining an output current of the rectifier device based on the monitored output voltage.

11. The method of claim 7, further comprising
determining an output current of the rectifier device based on the monitored output voltage, wherein the input power to the tag is determined based on the output current.

12. The method of claim 7, wherein the input impedance of the tag is modulated based on backscatter data when the tag is backscattering data to an RFID reader.

13. The method of claim 7, wherein the input impedance is increased to compensate for a decrease in the input impedance associated with an increase of the input power.

14. An apparatus comprising:
a receiver to receive an input power;
a controller circuit coupled to the receiver, wherein the controller circuit is configured to monitor the input power on a tag, wherein the controller circuit is configured to select one or more rectifier stages on the tag; and is configured to bypass the selected one or more rectifier stages to increase an input impedance of the tag, if the monitored input power is greater than a predetermined level; and wherein the controller circuit is configured to increase a backscatter level of the tag based on the increased input impedance.

15. The apparatus of claim 14, wherein the controller circuit is further configured to determine if the input power is greater than the predetermined level.

16. The apparatus of claim 14, wherein the controller circuit is further configured to send a control signal to turn off a switch coupled to a rectifier stage of the tag.

17. The apparatus of claim 14, wherein the input impedance is increased for a predetermined time, the predetermined time being at least one of a transaction time or a tag transmission time.

18. The apparatus of claim 14, wherein the control circuit is further configured to monitor an output voltage on the tag to monitor the input power.

19. The apparatus of claim 14, wherein the input impedance of the tag is modulated based on backscatter data when the tag is backscattering data to a reader.

20. A tag to increase a backscatter level, the tag comprising:
a receiver to receive an input power;
a rectifier device comprising one or more stages coupled to the receiver; and
a controller circuit coupled to the rectifier device, wherein the controller circuit is configured to monitor an output voltage of the rectifier device, wherein the controller circuit is configured to determine an input power to the tag based on the output voltage, and wherein the controller circuit is configured to select one or more rectifier stages on the tag; and is configured to bypass the selected one or more rectifier stages, if the input power is greater than a first predetermined threshold, and wherein the controller circuit is configured to increase the backscatter level of the tag based on the increased input impedance.

21. The tag of claim 20, wherein the controller circuit is further configured to send a first control signal to a first switch coupled to the rectifier device, if the input power is greater than the first predetermined level; and wherein the controller circuit is further configured to send a second control signal to a second switch coupled to the rectifier device, if the input power is greater than a second predetermined level.

22. The tag of claim 20, wherein the input impedance is increased for a predetermined time, the predetermined time being at least one of a transaction time or a tag transmission time.

23. The tag of claim 20, wherein the controller circuit is further configured to determine an output current of the rectifier device based on the output voltage.

24. The tag of claim 20, wherein the input impedance of the tag is modulated based on backscatter data.

25. The tag of claim 20, wherein the input impedance is increased to compensate for a change in the input impedance associated with an increase of the input power.

* * * * *